(No Model.)

J. KING.
FRICTION CLUTCH AND LOOSE PULLEY.

No. 258,435. Patented May 23, 1882.

Witnesses:
N. H. Mortimer.
W. H. Kern.

Inventor:
Jno. King,
per F. A. Lehmann,
Atty.

UNITED STATES PATENT OFFICE.

JOHN KING, OF OSWEGO, NEW YORK, ASSIGNOR TO THE VULCAN IRON WORKS COMPANY, OF SAME PLACE.

FRICTION-CLUTCH AND LOOSE PULLEY.

SPECIFICATION forming part of Letters Patent No. 258,435, dated May 23, 1882.

Application filed February 8, 1882. (No model.)

*To all whom it may concern:*

Be it known that I, JOHN KING, of Oswego, in the county of Oswego and State of New York, have invented certain new and useful Improvements in Friction-Clutch or Loose Pulleys; and I do hereby declare the following to be a full, clear, and exact description of the invention, such as will enable others skilled in the art to which it pertains to make and use it, reference being had to the accompanying drawings, which form part of this specification.

My invention relates to an improvement in friction-clutch or loose pulleys; and it consists in the combination of a loose pulley, having a series of rings of paper or wood secured in it, with the clutch-blocks, clamping-bolts, socket-couplings, sleeve, and lever for moving the sleeve, as will be more fully described hereinafter.

The object of my invention is to provide a lining for pulley or clutch which will not only be very durable, but which can be replaced at a very slight cost when it has become worn, as especially applicable to dredgers and excavators.

Figure 1:
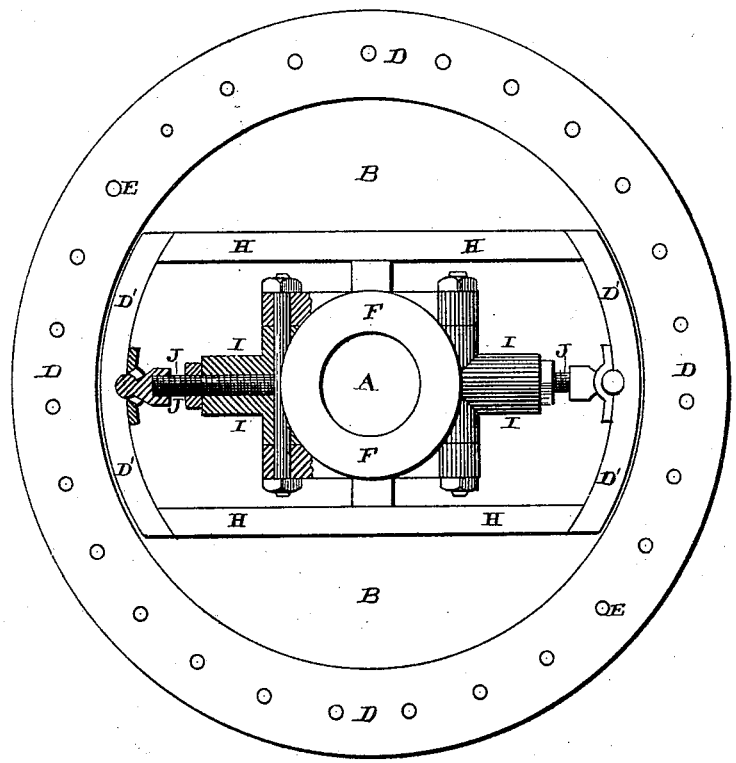
Figure 2:
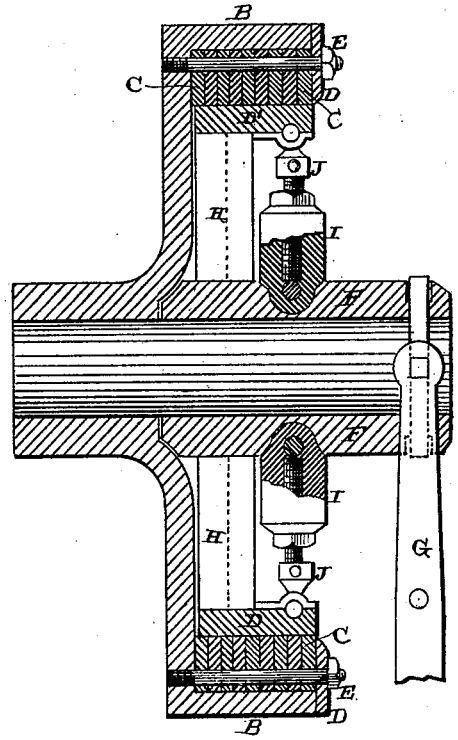

Figure 1 is a front view of my invention complete. Fig. 2 is a vertical section of the same.

A represents the shaft, and B the pulley, which revolves loosely when not in use. The inner side of the rim of the pulley or clutch is lined with separate rings of paper, C, which are securely held in place by means of the outer metallic ring, D, and the bolts E. These rings may be made of paper, pulp, wood, or any other suitable tough substance which is not readily worn away by frictional contact, and which can be very cheaply replaced after it has become worn.

Placed upon the shaft A is the sleeve F, which is keyed or otherwise connected to the shaft so as to revolve with it, and at the same time it is adapted to be moved upon the shaft by means of the pivoted lever G. Secured to this sleeve in any suitable manner are the two guides H, between which the two frictional blocks D' are placed. These blocks are separated any suitable distance from each other at their inner ends, and have their outer ends widened out the full width of the interior thickness of the lining of the pulley, as shown in Fig. 2.

In opposite sides of the sleeve are made suitable recesses, in which are pivoted the T-shaped socket-couplings I, into the outer ends of which are screwed the adjustable connecting-rods J. These rods are fastened by means of a ball-and-socket joint, or loosely connected to the inner sides of the sliding blocks D' in any suitable manner. When the sleeve is drawn outward by means of the pivoted lever these connecting-rods draw the blocks D' inward toward the shaft, so as to withdraw their outer ends from frictional contact with the paper or wooden lining. When, however, the sleeve is forced toward the center of the pulley, these connecting-rods force the blocks D' outward, so as to bring their outer ends in frictional contact with the lining of the pulley with any desired degree of force. When these outer ends are locked against the inner side of the pulley by frictional contact the pulley is made to revolve with the shaft the same as if it formed a part thereof.

The great advantage gained by the construction here shown and described consists in making the lining of the pulley or clutch of some cheap substance which is very difficult to be worn away, but which, when it has become worn away, can be replaced at a very slight cost. The friction-blocks D' being connected to the sliding sleeve enables the blocks to be brought in and moved out of contact with the lining of the pulley by a very slight movement upon the part of the operating-lever, and always in line with the fiber of the paper, wood, or other substance, in contradistinction to across the grain. Where the friction is applied in a line with the grain the lining is not worn away as rapidly as where the friction is across the grain.

Another advantage of my invention consists in making each part of my lining out of a circle or ring, so that when applied to the inner side of the rim of the pulley the same bolts will pass through all of the parts, instead of having to use a separate bolt or fastening device for each part, or to have castings to receive and hold the parts in place.

Having thus described my invention, I claim—

A loose pulley having a series of rings, C, secured inside of it, the friction-blocks D', the screws J, the sockets I, sleeve F, and lever G, substantially as shown and described.

In testimony whereof I affix my signature in presence of two witnesses.

JOHN KING.

Witnesses:
M. L. KIRSHNER,
R. G. HALBROOK.